United States Patent Office 2,969,364
Patented Jan. 24, 1961

2,969,364

DERIVATIVES OF 5-AMINO URACIL

Douglas A. Lyttle, Kalamazoo, Mich., assignor to The Upjohn Company, Kalamazoo, Mich., a corporation of Michigan No Drawing. Filed Dec. 26, 1957, Ser. No. 705,140

7 Claims. (Cl. 260—256.4)

This invention relates to novel organic compounds and to a process for preparing them. It is more particularly directed to 5-[bis(2-haloethyl)amino]uracil, to a 5-[bis(2-hydroxyethyl)amino]uracil intermediate, and to a process for preparing the same. The novel compounds of the invention can be represented by the following general structural formula:

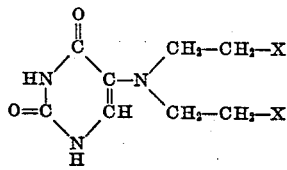

wherein X is a halogen having an atomic weight between 35 and 127.

The 5-[bis(2-haloethyl)amino]uracils of this invention are related to the simple nitrogen mustards such as bis- and tris- 2-chloroethylamines; and they posses the general chemical reactivities ascribable to the bis(2-chloroethyl)amino group.

The 5-[bis(2-haloethyl)amino]uracils of this invention posses antibiotic activity and are useful for the control of pathogenic fungi such as *Microsporum canis* and *Kloeckera brevis*. They are also active against microorganisms such as *Trichomonas vaginalis*. Moreover, the compounds are phytotoxic and can be used to kill weeds.

The compounds of the invention can be prepared by 2-hydroxyethylation of 5-aminouracil to produce 5-[bis(2-hydroxyethyl)amino]uracil, and then replacing the hydroxyl groups with halogen. Suitably, the 5-aminouracil is reacted with a 2-hydroxyethylating agent such as ethylene oxide or an ethylene halohydrin such as ethylene chloro- or bromohydrin, or otherwise 2-hydroxyethylated; and the 5-[bis(2-hydroxyethyl)amino]uracil obtained is reacted with a thionyl halide, a phosphoryl halide, or the like to give the desired 5-[bis(2-haloethyl)amino]uracil.

In a preferred embodiment of the process of the invention ethylene oxide and 5-aminouracil are mixed with cooling, in the presence of an inert medium such as aqueous acetic acid, in order to minimize the formation of undesirable by-products. After mixing, the reactants are slowly brought to room temperature with stirring to complete the reaction.

The resulting 5-[bis(2-hydroxyethyl)amino]uracil can be separated from the reaction mixture by absorption or ion-exchange chromatography, solvent extraction, or conventional crystallization and recrystallization techniques.

Advantageously, the reaction mixture is treated with the acid form of Dowex-50 (a sulfonated polystyrene-divinylbenzene copolymer) and the 5-[bis(2-hydroxyethyl)amino]uracil is eluted with a dilute aqueous alkali. After evaporation of the eluate, the solids which remain are extracted with isopropyl alcohol and 5-[bis(2-hydroxyethyl)amino]uracil is crystallized from the extract solution.

Halogen substitution of the bis(2-hydroxyethyl)amino intermediate is accomplished by methods commonly known in the arts. For example, a halogenating agent such as thionyl chloride or thionyl bromide is reacted with 5-[bis(2-hydroxyethyl)amino]uracil in the presence of an inert solvent such as diethylene glycol dimethyl ether, to yield 5-[bis(2-chloroethyl)amino]uracil or 5-[bis(2-bromoethyl)amino]uracil, which can then be separated from the reaction mixture in conventional manner. Other halogenating agents can be used such as phosphorus trichloride or tribromide, phosphoryl chloride or bromide, and phosphorus pentachloride or pentabromide.

The iodo compound of the invention, namely, 5-[bis(2-idoethyl)amino]uracil, is prepared by metathetic reaction using an alkali metal iodide such as sodium or potassium iodide with either 5-[bis(2-chloroethyl)amino]uracil or 5-[bis(2-bromoethyl)amino]uracil, preferably in the presence of an inert solvent such as acetone.

The following examples are illustrative of the process and products of the present invention, but are not to be construed as limiting.

EXAMPLE 1

A. *Preparation of 5-[bis(2-hydroxyethyl)amino]uracil*

Twenty grams (0.157 mole) of 5-aminouracil was mixed with 350 milliliters of water, 23 milliliters of glacial acetic acid, and 160 milliliters of ethylene oxide in a one-liter flask immersed in an ice bath. The reaction mixture was stirred and allowed to come to room temperature slowly (as the ice melted), and stirring was continued for two days. A clear solution resulted to which was added 250 milliliters of water and sixty grams of Dowex–50 in the acid form. The mixture was stirred for fifteen minutes, and the resin was collected on a filter. It was washed with water and the crude 5-[bis(2-hydroxyethyl)amino]uracil was eluted with a ten percent aqueous solution of aminium hydroxide. This eluate was evaporated to dryness, and the solid that remained was heated with 350 milliliters of isopropyl alcohol. Undissolved substances were removed by filtration and the filtrate was concentrated on a steam bath to a volume of about 125 milliliters and cooled to effect crystallization. After twenty hours at room temperature the crystals that had formed were recovered, washed with isopropyl alcohol, and dried, yielding 15.61 grams (46.2 percent) of crystalline 5-[bis(2-hydroxyethyl)amino]uracil having a melting point of 157 to 163 degrees centigrade. An analytical sample, obtained by several recrystallizations from isopropyl alcohol, melted at 166 to 168 degrees centigrade.

*Anal.*—Calc'd. for $C_8H_{13}N_3O_4$: C, 44.64; H, 6.09; N, 19.53. Found: C, 44.60; H, 6.55; N, 19.19.

B. *Preparation of 5-[bis(2-chloroethyl)amino]uracil*

Thirteen milliliters of thionyl chloride was added to 52 milliliters of diethylene glycol dimethyl ether accompanied by stirring. Heat was generated, and sulfur dioxide and hydrogen chloride were liberated. The mixture was cooled and 5.58 grams of 5-[bis(2-hydroxyethyl)amino]uracil was added, followed by eight milliliters of thionyl chloride. No evidence of reaction was noted, and the reaction mixture was heated to about forty degrees centigrade, gas then being evolved. After one hour at forty degrees centigrade, five milliliters of thionyl chloride was added; and after thirty minutes, another three milliliters was added. The mixture was then heated to 55 degrees centigrade, whereupon it darkened and all of the solid dissolved. After cooling and storage at room temperature for twenty hours, three volumes of benzene was added and a dark solid precipitated. After one hour, the dark solid was collected on a filter, washed with benzene, and dissolved in a minimum of boiling methanol. Crystals formed upon cooling; and after eighteen hours in the refrigerator, they were recovered on a filter, washed with cold methanol, and dried under reduced pressure, yielding 2.96 grams of 5-[bis(2-chloroethyl)amino]uracil. The product was recrystallized by dissolving in a minimum of hot methanol and adding water until the solution became cloudy; 2.25 grams of 5-[bis(2-chloroethyl)amino]uracil was recovered after cooling the mixture to four degrees centigrade for sixteen hours (melting point 200 to 205 degrees centigrade). A small sample was recrystallized again, and it melted at 198 to 204 degrees centigrade.

Analysis.—Calc'd for $C_8H_{11}Cl_2N_3O_2$: C, 38.11; H, 4.40; Cl, 28.13; N, 16.67. Found: C, 38.54; H, 4.44; Cl, 27.88; N, 16.83.

EXAMPLE 2

A. Preparation of 5-[bis(2-hydroxyethyl)amino]uracil

Fifty grams of 5-aminouracil was mixed with 875 milliliters of water and 55 milliliters of glacial acetic acid and cooled in an ice bath with stirring. Three hundred milliliters of ethylene oxide was added and the temperature was maintained at zero to five degrees centigrade for two hours. The mixture was allowed to come to room temperature with continued stirring for two days. All solids had dissolved. After excess ethylene oxide has been removed under reduced pressure, 700 milliliters of water was added followed by 200 grams of the acid form of Dowex-50 and the mixture was stirred for two hours. The resin was recovered on a filter and washed three times with 200-milliliter portions of water. It was then stirred into 450 milliliters of ten percent aqueous ammonium hydroxide for one hour in order to elute the crude 5-[bis(2-hydroxyethyl)amino]uracil. The mixture was filtered and the resin washed with 200 milliliters of five percent aqueous ammonium hydroxide and 150 milliliters of water. The filtrate and wash solutions were combined and evaporated under vacuum; a white gummy solid remained.

This material was heated with 700 milliliters of isopropyl alcohol and the insoluble material removed by filtration. The filtrate was evaporated at atmospheric pressure until crystallization began, cooled to four degrees centigrade overnight, and filtered. The crystals were washed with cold isopropyl alcohol and dried under vacuum to give 56.7 grams (67 percent) of 5-[bis(2-hydroxyethyl)amino]uracil with a melting point of 162 to 165 degrees centigrade.

The mother liquor from the above crystallization was concentrated to about ninety milliliters, and after chilling for several days a second crop was obtained. The yield was 5.54 grams of 5-[bis(2-hydroxyethyl)amino]uracil having a melting point of 150 to 160 degrees centigrade. This product can be used as such in the halogenation step or further purified by recrystallization from isopropyl alcohol.

B. Preparation of 5-[bis(2-chloroethyl)amino]uracil.

Eight milliliters of ethyl alcohol and fourteen drops of water were added to 310 milliliters of diethylene glycol dimethyl ether and stirred. Then eleven milliliters of thionyl chloride was slowly added from a dropping funnel. A slight reaction occurred with generation of heat and release of sulfur dioxide and hydrogen chloride. The reaction mixture was cooled to about ten degrees centigrade and thirty grams of 5-[bis(2-hydroxyethyl)amino]uracil was added, followed by 35 milliliters of thionyl chloride. This reaction mixture was allowed to come to room temperature and stirred for twenty hours. One liter of benzene was added, and the resulting slurry was stirred for one hour. The solids were then collected on a glass filter, washed with benzene, and dried at room temperature under reduced pressure. This crude material was dissolved in 400 milliliters of boiling methanol containing four milliliters of concentrated hydrochloric acid. To the hot methanol solution was added 400 milliliters of hot (70 degrees centigrade) water, and the mixture was rapidly cooled in an ice bath. It was kept in the ice bath for four hours. Light tan crystals of 5-[bis(2-chloroethyl)amino]uracil separated and were recovered on a filter, washed with cold water, and dried under reduced pressure at room temperature. They weighed 22.85 grams (65 percent yield) and had a melting point of 203 to 206 degrees centigrade.

The 5-[bis(2-chloroethyl)amino]uracil thus obtained was dissolved in 1100 milliliters of boiling acetone, and the solution was treated with magnesium silicate and decolorizing carbon, and filtered through a thin layer of filter aid. The filtrate was concentrated at atmospheric pressure until crystallization began, cooled overnight at zero to four degrees centigrade, and filtered. After washing with acetone, and drying under vacuum at room temperature, 16.63 grams of 5-[bis(2-chloroethyl)amino]uracil melting at 203 to 207 degrees centigrade was obtained. A second crop of crystals was obtained by reconcentrating the filtrate until crystallization began, and then treating as above. This crop weighed 3.48 grams and melted at 203 to 207 degrees centigrade.

Analysis.—Calc'd for $C_8H_{11}Cl_2N_3O_2$: C, 38.11; H, 4.40; Cl, 28.13. Found: C, 38.41; H, 4.25; Cl, 27.82.

EXAMPLE 3

Preparation of 5-[bis(2-iodoethyl)amino]uracil

A reaction mixture consisting of five grams (0.02 mole) of 5-[bis(2-chloroethyl)amino]uracil, nine grams (0.06 mole) of sodium iodide, and 100 milliliters of acetone was heated at 100 degrees centigrade for eighteen hours in a glass-lined, stainless steel autoclave. The mixture was cooled and filtered. The filtrate was evaporated to dryness under reduced pressure, the residue being an amber solid. The solid was slurried with 100 milliliters of water, the mixture was filtered, and the brown filter cake was dissolved in 250 milliliters of ethyl acetate. The solution was cooled to minus twenty degrees centigrade and quickly washed with two 100-milliliter portions of cold, one normal sodium thiosulfate solution. The washed ethyl acetate solution was dried with anhydrous magnesium sulfate, filtered, and the filtrate was evaporated to dryness under reduced pressure. By recrystallizing the residual yellow solid from ethyl acetate there was obtained purified 5-[bis(2-iodoethyl)amino]uracil which darkened between 170 and 177 degrees centigrade, and decomposed at about 240 degrees centigrade.

EXAMPLE 4

Preparation of 5-[bis(2-bromoethyl)amino]uracil

Following the procedure of Example 2, part B, but substituting thionyl bromide for thionyl chloride, 5-[bis(2-bromoethyl)amino]uracil is obtained.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A compound having the following formula:

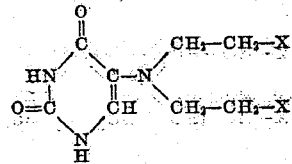

wherein X is a halogen having an atomic weight between 35 and 127.

2. 5-[bis(2-chloroethyl)amino]uracil.
3. 5-[bis(2-bromoethyl)amino]uracil.
4. 5-[bis(2-iodoethyl)amino]uracil.
5. 5-[bis(2-hydroxyethyl)amino]uracil.

6. The process which comprises reacting, in acid solution, 5-aminouracil with a hydroxyethylating agent selected from the group consisting of ethylene oxide and ethylene halohydrin, and halogenating the thus-obtained 5-[bis(2-hydroxyethyl)amino]uracil to form 5-[bis(2-haloethyl)amino]uracil wherein "halo" is a halogen having an atomic weight between 35 and 127.

7. The process of claim 6 wherein 5-aminouracil is reacted with an excess of ethylene oxide to form 5-[bis-(2-hydroxyethyl)amino]uracil which in turn is reacted, at a temperature below 55 degrees centigrade, with thionyl chloride in diethylene glycol dimethyl ether to form 5-[bis(2-chloroethyl)amino]uracil.

References Cited in the file of this patent

Phillips: Jour. Amer. Chem. Soc., volume 73, pages 1061–2 (March 1951).

Whitmore, Organic Chemistry (second edition), pages 311 and 288. (1951).

Larionov, The British Journal of Cancer, vol. X, No. 1 (March 1956), pp. 26–32.